(12) United States Patent
Desmond et al.

(10) Patent No.: US 7,041,258 B2
(45) Date of Patent: May 9, 2006

(54) MICRO-CHANNEL DESIGN FEATURES THAT FACILITATE CENTRIPETAL FLUID TRANSFER

(75) Inventors: Sean M. Desmond, San Carlos, CA (US); John Shigeura, Portola Valley, CA (US)

(73) Assignee: Applera Corporation, Foster City, CA (US)

( * ) Notice: Subject to any disclaimer, the term of this patent is extended or adjusted under 35 U.S.C. 154(b) by 73 days.

(21) Appl. No.: 10/336,330

(22) Filed: Jan. 3, 2003

(65) Prior Publication Data

US 2004/0018117 A1    Jan. 29, 2004

Related U.S. Application Data

(60) Provisional application No. 60/399,548, filed on Jul. 30, 2002, provisional application No. 60/398,851, filed on Jul. 26, 2002.

(51) Int. Cl.
*G01N 9/30* (2006.01)
*B01L 11/00* (2006.01)
*C12M 1/10* (2006.01)

(52) U.S. Cl. ............... 422/100; 422/101; 422/102; 436/45; 436/177

(58) Field of Classification Search ............... 422/72, 422/100–102; 436/45, 177; 435/288.2, 435/288.4, 288.5
See application file for complete search history.

(56) References Cited

U.S. PATENT DOCUMENTS 5,846,396 A    12/1998   Carpio
6,143,248 A    11/2000   Kellogg et al. ............... 422/72
6,153,148 A *  11/2000   Thomas ........................ 422/72
6,296,020 B1   10/2001   McNeely et al.
6,485,690 B1   11/2002   Pfost et al.
2002/0037499 A1  3/2002   Quake et al.
2002/0064885 A1  5/2002   Bedingham et al.
2002/0106786 A1* 8/2002   Carvalho et al. ......... 435/287.3
2002/0122747 A1  9/2002   Zhao et al. ................... 422/99
2002/0125135 A1  9/2002   Derand et al. .............. 204/454
2002/0127149 A1  9/2002   Dubrow et al. ............. 422/102
2002/0172621 A1  11/2002  Barbera-Guillem ......... 422/100
2002/0176804 A1  11/2002  Strand et al. ............... 422/100
2003/0029724 A1  2/2003   Derand et al. .............. 204/451
2003/0143114 A1* 7/2003   Andersson et al. ........... 422/64
2003/0150806 A1* 8/2003   Hobbs et al. ............... 210/635
2004/0067051 A1* 4/2004   Kylberg et al. ............. 392/407

FOREIGN PATENT DOCUMENTS

WO    WO 00/31602       6/2000
WO    WO 01/04909 A1    1/2001
WO    WO 01/87485 A2    11/2001
WO    WO 02/074438 A2   9/2002
WO    WO 02/083310 A2   10/2002
WO    WO 03/072255 A1   9/2003

OTHER PUBLICATIONS

Copy of Supplementary European Search Report Mailed Jul. 14, 2005, 2 pages.

* cited by examiner

*Primary Examiner*—Lyle A. Alexander
(74) *Attorney, Agent, or Firm*—Kilyk & Bowersox, P.L.L.C.

(57) ABSTRACT

Microfluidic devices, assemblies, and systems are provided, as are methods of manipulating micro-sized samples of fluids. Microfluidic devices having a plurality of specialized processing features that facilitate centripetal fluid transfer are also provided.

6 Claims, 5 Drawing Sheets

MICRO-CHANNEL DESIGN FEATURES THAT FACILITATE CENTRIPETAL FLUID TRANSFER

CROSS REFERENCE TO RELATED APPLICATIONS

The present application claims benefit under 35 U.S.C. § 119(e) from earlier filed U.S. Provisional Application No. 60/399,548, filed Jul. 30, 2002, and U.S. Provisional Patent Applications No. 60/398,851 filed Jul. 26, 2002, both of which are incorporated herein in their entireties by reference. Cross-Reference is also made to U.S. patent application Ser. Nos. 10/336,274 and 10/336,706, both filed Jan. 3, 2003, both of which are also herein incorporated in their entireties by reference. Cross-reference is also made to U.S. Provisional Patent Applications Nos. 60/398,852; 60/398,778; 60/398,934; 60/396,777; and 60/398,946; all filed on Jul. 26, 2002, and all of which are also herein incorporated in their entireties by reference.

FIELD

The present application relates to microfluidic devices, systems that include such devices, and methods that use such devices and systems. More particularly, the present application relates to devices that manipulate, process, or otherwise alter micro-sized amounts of fluids and fluid samples.

BACKGROUND

Microfluidic devices are used for manipulating fluid samples. There continues to exist a demand for microfluidic devices, methods of using them, and systems incorporating them for processing samples that are fast, reliable, consumable, and can be used to process large number of samples simultaneously.

SUMMARY

According to various embodiments, a microfluidic device is provided having a flow channel and including an excess fluid capture reservoir. The device can provide a metered quantity of sample for processing and capture all excess sample.

According to various embodiments, a microfluidic device is provided having a substrate having a first surface, an opposite second surface, and a thickness, an input port formed in at least one of the first and second surfaces, and a manifold formed in the substrate and in fluid communication with the input port, the manifold including a feed channel that extends in a first direction, and a plurality of branch channels each branching off the feed channel and each terminating at a closed end. The branch channels can be parallel to one another. The substrate can also include a plurality of respective chambers, at least one chamber formed in the substrate adjacent the closed end of each branch channel.

According to various embodiments, a sample processing system is provided having a microfluidic device and a processing apparatus. The microfluidic device includes a substrate having a first surface, an opposite second surface, and a thickness, an input port formed in at least one of the first and second surfaces, and a manifold. The manifold can be formed in the substrate and in fluid communication with the input port, and can include a feed channel that extends in a first direction, and a plurality of parallel branch channels branching off the feed channel. The branch channels can be parallel to one another. The processing apparatus can include a rotatable platen having an axis of rotation, a holder capable of holding a microfluidic device on or in the platen and being disposed off-center with respect to the axis of rotation, and a drive unit to rotate the platen about the axis of rotation.

According to various embodiments, a sample processing system is provided having a microfluidic device and a processing apparatus. The microfluidic device can include a substrate having a first substantially rectangular surface, a second substantially rectangular surface opposite the first surface, a thickness, a length, a width, and a plurality of geometrically parallel processing pathways arranged parallel to either the length or the width of the substrate. The processing apparatus can include a rotatable platen having an axis of rotation, and a holder capable of holding the microfluidic device on or in the platen and disposed off-center with respect to the axis of rotation. The holder can be capable of holding the microfluidic device in or on the platen such that any radius of the platen that is parallel to the length or the width of the microfluidic device does not intersect the other of the width or the length, respectively, of the microfluidic device.

According to various embodiments, a method of distributing a liquid sample into a plurality of branch channels in a microfluidic device is provided that can include providing a microfluidic device, introducing a liquid sample through an input port and into a feed channel of the device, and centrifugally spinning the microfluidic device to force fluid from the feed channel into the branch channels. The microfluidic device can include a substrate, an input port, and a manifold, wherein the substrate includes a first surface, an opposite second surface, and a thickness, the input port is formed in at least one of the first and second surfaces, and the manifold is formed in the substrate in fluid communication with the input port. The manifold can include the feed channel that extends in a first direction, and a plurality of branch channels each branching off the feed channel normal to the feed channel. The branch channels can be parallel to one another.

BRIEF DESCRIPTION OF THE DRAWINGS

FIG. 7b is an enlarged portion of FIG. 7a taken along dashed line 7b, shown in FIG. 7a.

DETAILED DESCRIPTION OF CERTAIN EMBODIMENTS

According to various embodiments, a microfluidic device is provided having a flow channel and including an excess fluid capture reservoir. The device can provide a metered quantity of sample for processing and capture all excess sample.

Figure 1:
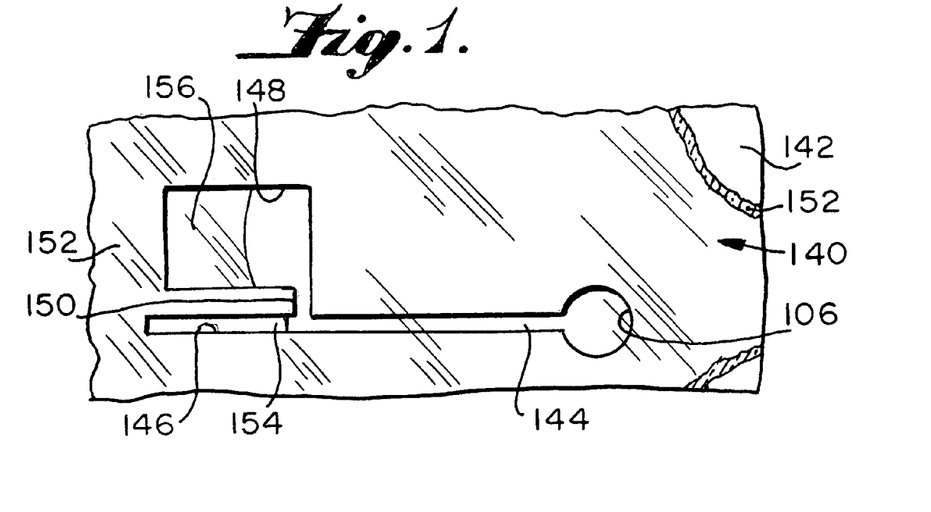
FIG. 1 is a top view of a microfluidic device having a fluid capture appendix.

FIG. 1 is a top view of a microfluidic device 140 that can be used, for example, to capture an excess fluid sample which can be retained after sample processing, for example, after PCR amplification. Microfluidic device 140 includes a substrate 142 having an input port 106 and an input channel 144. Input channel 144 connects to a feed channel 150 that is divided into two parallel branch channels 146 and 148 of unequal volume. Parallel branch channel 148 can be used as an excess fluid capture reservoir appendix. Input channel 144 is upstream of parallel branch channels 146 and 148. Upstream of input channel 144 can be an input port 106 as shown, or a chamber, well, or opening. While the parallel branch channel 148 is designed as an appendix and is not in any further fluid communication with any other chambers, the parallel branch channel 146 can be in fluid communication with other chambers, wells, or openings further downstream, or can be made to be in fluid communication as by valving.

According to various embodiments, a PCR reaction can be performed, for example, in a 5 μL volume, wherein a 2 μL volume can be required for the sequencing reaction, and a remaining 3 μL volume can be used for diagnostics. A user can analyze this excess diagnostic material on an agarose gel to verify that fragments are being properly amplified. To enable analysis, parallel branch channel 148 can be used as a fluid capture appendix. Branch channel 146 can contain 2 μL of sample 154 while an excess 3 μL of sample 156 can be contained in parallel branch channel 148. In various embodiments, a valve can be opened after distribution of the sample into the parallel branch channels, and the 2 μL sample 154 can flow to a subsequent reaction chamber, for example, an EXO-SAP chamber, while the excess sample 156 remains in branch channel 148. According to various embodiments, the excess sample 156 can be accessed by piercing a cover 152 of the device with a needle, syringe, or pipette, and carefully extracting a desired amount of sample 156 from branch channel 148.

According to various embodiments, a microfluidic device is provided having a substrate having a first surface, an opposite second surface, and a thickness, an input port formed in at least one of the first and second surfaces, and a manifold formed in the substrate and in fluid communication with the input port. The manifold can include a feed channel that extends in a first direction, and a plurality of branch channels each branching off the feed channel and each terminating at a closed end. The branch channels can be parallel to one another. The substrate can also include a plurality of respective chambers, at least one chamber formed in the substrate adjacent the closed end of each branch channel. Each of the plurality of branch channels can extend in a direction normal to the feed channel. Each of the plurality of branch channels can be in interruptible fluid communication with a respective pathway having at least one processing chamber. A valve can be provided between each of the branch channels and its respective at least one processing chamber. Each of the plurality of branch channels can have a valve. The manifold can contain a first volume of fluid, about equal to the collective volume of the plurality of branch channel volumes. According to various embodiments, each of the plurality of branch channels in the microfluidic device extends in a direction that can be parallel to and/or normal to the first surface of the substrate in the microfluidic device.

According to various embodiments, each of the plurality of branch channels has a volume. The collective volume of the plurality of branch channels in the microfluidic device can be from about 5 μl to about 100 μl, for example, about 50 μl. The volume of each parallel branch channel can be from about 0.05 μl to about 5 μl, for example, 0.5 μl, 1 μl, or 2 μl.

According to various embodiments, the input port of the microfluidic device can be teardrop-shaped, having a wide end and a narrow end, wherein the narrow end is in fluid communication with the feed channel.

Figure 2:
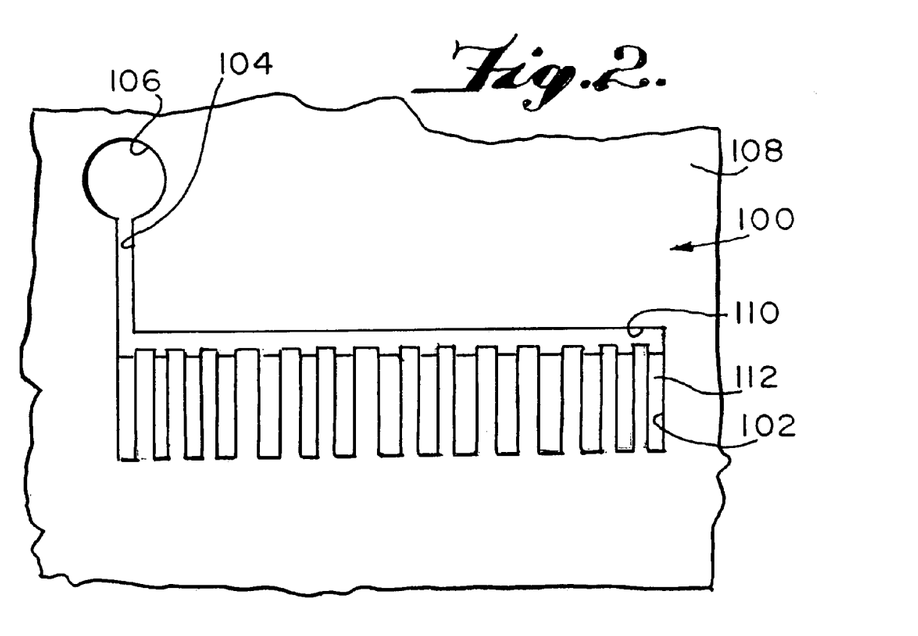
FIG. 2 is a top view of a microfluidic device having a manifold having a feed channel and a plurality of parallel branch channels.

FIG. 2 is a top view of a microfluidic device 100. Microfluidic device 100 can be formed in a substrate 108. Microfluidic device 100 can include an input port 106 in fluid communication with an input channel 104 connected to a feed channel 110. A plurality of parallel branch channels 102 can connect to feed channel 110. Microfluidic device 100 can in this configuration be used as a flow distributor. Microfluidic device 100 can be used to split a single fluid sample into a plurality of sub-portions. Similar microfluidic devices but used to divide a sample into only two portions are referred to herein as flow splitters.

In operation, microfluidic device 100 can be placed on a rotatable platen (not shown) and the platen can be spun. Substrate 108 can be oriented in a holder in, on or for the platen such that input channel 104 can be radially closer to the center of the platen than the plurality of parallel branch channels. According to various embodiments, input channel 104 can be disposed in substrate 108 such that input channel 104 connects to feed channel 110 at a radially measured point along feed channel 110 closest to the center of the platen and centrifugation provides a plurality of aliquots or sample portions 112. According to various embodiments, fluid distributors for splitting the fluid sample from one sample into 2 or more samples or aliquots, can be formed, for example, for splitting a sample into 2, 3, 6, 12, 24, 48, 96, 192, or 384 samples or aliquots.

Parallel branch channels 102 can be used to obtain equal volumes of fluids in as many portions or aliquots 112 as desired. Parallel branch channels 102 can be in fluid communication with processing chambers (not shown) forming individual pathways for further processing of each aliquot 112. The pathways can be used to perform a single reaction or process, for example, forward sequencing, or can perform multiple same or multiple distinct reactions or processes, for example, PCR, on an aliquot. Reagents needed to perform a certain reaction or process in the processing chamber of a pathway can be loaded in the respective processing chamber at the time of manufacture of the microfluidic device 100, or can be loaded at the time of use.

According to various embodiments, parallel branch channels 102 can have reagents disposed therein such that a reaction can take place in parallel branch channels 102.

Reagents can be disposed in the processing chambers using any methods known in the art. For example, reagents can be sprayed and dried, delivered using a diluent, injected using a capillary, a pipette, and/or a robotic pipette, or otherwise disposed in the processing chambers or channels.

According to various embodiments, input channel 104 can connect to feed channel 110 at any point on feed channel 110 that opposes parallel branch channels 102. The connection can be, for example, at a midpoint of feed channel 110 or proximate to an end of feed channel 110. According to various embodiments, feed channel 110 can be an input port. According to various embodiments, parallel branch channels 102 do not connect with feed channel 110 at a right angle.

According to various embodiments, fluid communication downstream of parallel branch channels 102 can be interruptible by using a plurality of respective valves (not shown). According to various embodiments, each parallel branch channel 102 can have a respective valve in fluid communication with the parallel branch channel 102. Microfluidic device 100 can be spun on a platen to deliver a fluid sample from input port 106 to each parallel branch channel 102 before valves in fluid communication with each parallel branch channel 102 are manipulated. According to various embodiments, a valve does not have to be in fluid communication with one or more of parallel branch channels 102. According to various embodiments, a fluid sample can be manipulated through feed channel 110 and can fill a first parallel branch channel 102 until overflow from that parallel branch channel 102 flows into the next, adjacent parallel branch channel.

Figure 3:
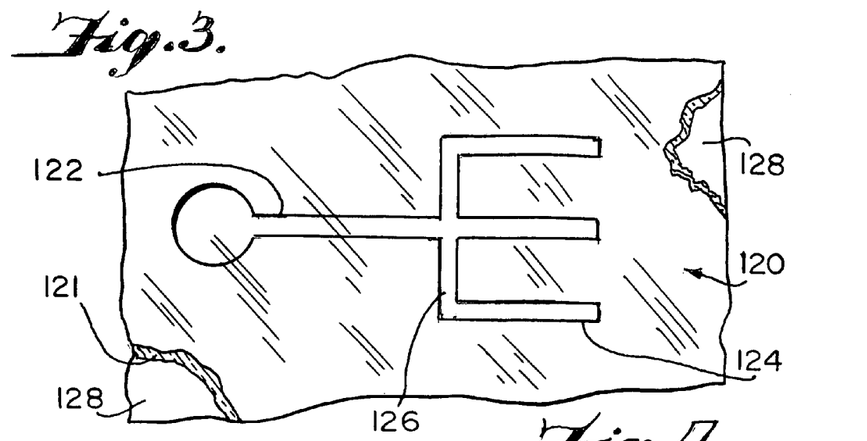
FIG. 3 is a top view of a microfluidic device having a flow splitter.

FIG. 3 is a top view of a microfluidic device 120 that includes a substrate 128 and a cover layer 121. Input channel 122 under cover layer 121 connects to a manifold including feed channel 126 and a plurality of parallel branch channels 124 in fluid communication with the feed channel 126, all also under cover layer 121. Input channel 122 can connect to feed channel 126 proximate to a mid-point of feed channel 126.

FIGS. 1–3 depict flow splitters formed in a microfluidic device in a planar format, for example, either in a first surface or a second surface of the substrate. This arrangement is in the horizontal plane and is one possible embodiment for splitting a fluid sample. According to various embodiments, the fluid sample can be split in a vertical plane of the substrate.

According to various embodiments, a flow distributor can be formed within a thickness of a substrate. According to various embodiments, the flow splitter implemented in the vertical plane can have a closed-end branch channel, an open-end branch channel, or a plurality of open-end and/or close-end branch channels, or a combination thereof. A closed-end branch channel can be an appendix such as a fluid capture appendix.

According to various embodiments, a flow distributor can be right-justified or left-justified with respect to its placement in a holder in a rotatable platen in a direction toward a central axis of rotation of the platen. A right-justified flow distributor has an input channel connected to a right-end of the feed channel. A left-justified flow distributor has an input channel connected to a left-end of the feed channel. A flow distributor can be center-justified, having an input channel connected to a proximate center along the length of the feed channel.

Figure 4:
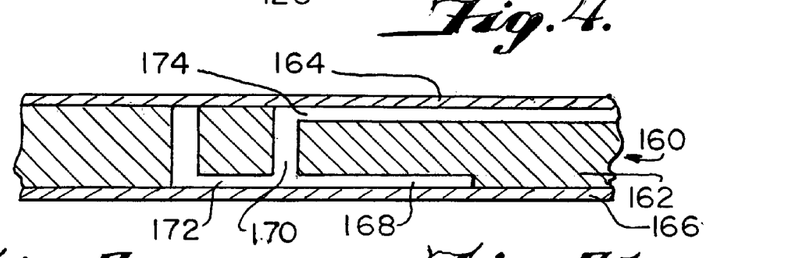
FIG. 4 is a side view of a microfluidic device having a flow splitter in the depth profile of a substrate.

FIG. 4 is a side-perspective view of a microfluidic device 160 according to various embodiments. An input channel 172 is in fluid communication with a manifold including feed channel 170. Feed channel 170 is in fluid communication with parallel branch channels 168 and 174 formed in a substrate 162. The microfluidic device further includes a first cover 164 and a second cover 166, for example, made of plastic or metal film or foil. In the embodiment shown, parallel branch channels 168 and 174 are formed in the depth dimension of substrate 162. A volume of sample fluid can be retained in parallel branch channel 168 of microfluidic device 160. According to various embodiments, the fluid can be transferred to a subsequent channel or chambers after opening a valve (not shown), or stored in parallel branch channel 168 for future analysis. When the fluid is stored, parallel branch channel 168 can be used as an appendix, reservoir, or other device for excess fluid capture. The arrangement of chambers, valves, channels, and vias as described and shown with reference to FIG. 4 is referred to herein as a vertical splitter.

According to various embodiments, microfluidic devices, for example, microfluidic devices 100, 120, 140, and 160 described in the various figure herein, can be formed in a rectangular substrate. An input port of the microfluidic device can be a teardrop-shaped chamber. According to various embodiments, the microfluidic device can be held in or on a platen and rotated around a central axis of rotation of the platen. A rotational force necessary to spin the platen including the microfluidic device can be sufficient to communicate a fluid from an input port of the microfluidic device into a flow distributor, into a flow restrictor, and/or through a valve. A volume of sample fluid captured in an appendix of the microfluidic device can be greater, the same, or less than the volume of fluid in a parallel branch channel.

Figure 5A:
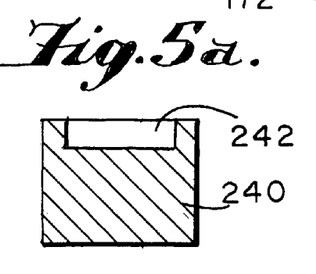
FIGS. 5a–5d are cross-sectional views of microfluidic channels having various profiles in the substrate.
Figure 5B:
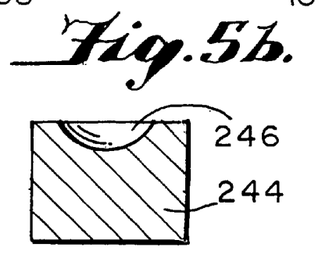
Figure 5C:
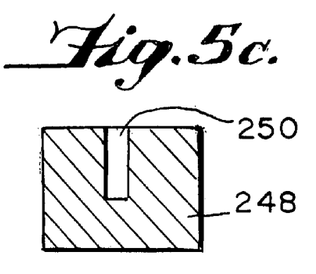
Figure 5D:
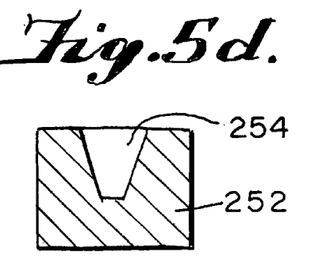

FIGS. 5a–5d are cross-sectional views of various channel profiles that can be used in microfluidic devices according to various embodiments. In FIG. 5a, channel 242 is formed with a rectangular cross-sectional area in a substrate 240. The cross-sectional area has an aspect ratio, that is, a width/depth ratio, of greater than one. In FIG. 5b, channel 246 is formed with a semi-oval cross-sectional area in a substrate 244. The cross-sectional area has an aspect ratio, that is, a width/depth ratio, of greater than one. In FIG. 5c, a thin and narrow channel 250 is formed in a substrate 248, wherein the cross-sectional area has an aspect ratio, that is, a width/depth ratio, of less than one. In FIG. 5d, a channel 254 is formed with a trapezoidal cross-sectional area in a substrate 252 and generally has an aspect ratio of les than one. These and other cross-sectional designs can be used as channels, for example, flow-restricting channels, and can be preformed or formed during a valve-opening operation according to various embodiments.

The dimensional characteristics of an exemplary straight channel flow restrictor cross-section can be, for example, about 0.2 mm by about 0.2 mm. The width of such a channel can be from about 0.05 mm to about 0.5 mm, for example, about 0.2 mm. The height of such a channel can be from about 0.05 mm to about 0.5 mm, for example, about 0.2 mm. The length of such a channel can be, for example, from about 0.1 mm to about 10 cm, for example, about 5 mm. A flow restrictor can be used in conjunction with a larger chamber having a minimum 5 mm. A flow restrictor can be used in conjunction with a larger chamber having a minimum dimension greater than approximately 0.50 mm, and can serve to retain particles in a chamber, for example, P-10 beads available from BioRad, size-exclusion ion-exchange beads, particulates, size-exclusion chromatography beads, other particles known to those skilled in the art, or a combination thereof. The flow restrictor can be located downstream of the chamber holding the particles. Downstream means the flow restrictor is located at a greater distance away from the axis of rotation when the device is operably held on a rotatable platen, than the chamber. When subjected to a centripetal force, the fluid sample and the particulates in the chamber can move toward the flow restrictor where the particulates can be retained while the fluids can pass into an adjacent channel or chamber.

According to various embodiments and as described above, dimensions of the flow restrictor are not limited to square cross-sections. Other shapes can be successfully implemented. For example, a rectangular flow-restricting channel having a cross-section with about a 0.10 mm depth and about a 0.30 mm width can be formed in a substrate to retain gel filtration media such as P-10 beads available from BioRad.

Figure 6A:
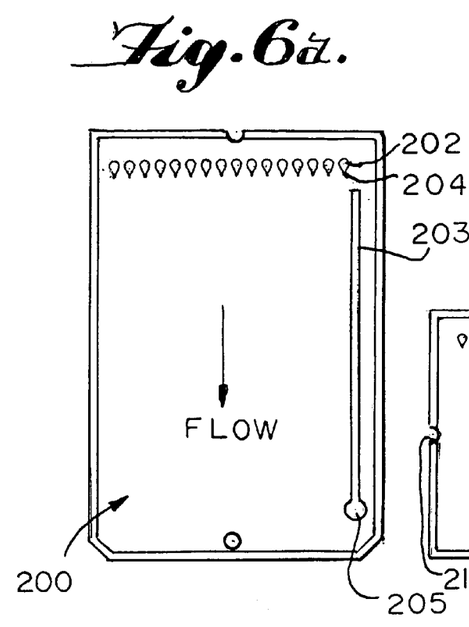
FIG. 6a is a top view of a microfluidic device depicting a rectangular substrate oriented to allow fluid movement across the length of the substrate.
Figure 6B:
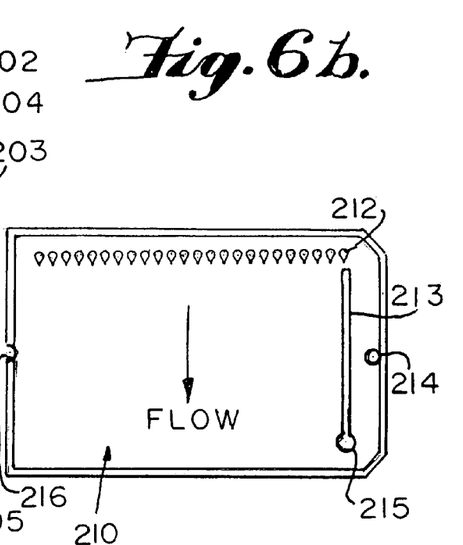
FIG. 6b is a top view of a microfluidic device depicting a rectangular substrate oriented to allow fluid movement across the width of the rectangular substrate.

FIG. 6a is a top view of a microfluidic device 200 having a plurality of input ports 202 leading to a plurality of respective processing pathways, one of which is shown as 203. The exemplary processing pathway 203 can be in fluid communication with an exemplary output port 205. The flow arrow shown depicts a direction of fluid movement from input port 202 to output port 205. Input port 202 can be teardrop-shaped having a narrower-end 204 oriented in the same direction as the direction of fluid movement. The processing pathway 203 can be disposed across a length of the microfluidic device, wherein the length of the microfluidic device is greater than a width of the microfluidic device. exemplary processing pathway 213 can be in fluid communication with an exemplary output port 215. A flow arrow depicts a direction of fluid movement from input port 212 to output port 215. The processing pathway 213 can be disposed across a width of the microfluidic device wherein a length of the microfluidic device is greater than the width of the microfluidic device. An alignment pinhole 214 and an alignment notch 216 can be provided in the microfluidic device 210.

Figure 6C:
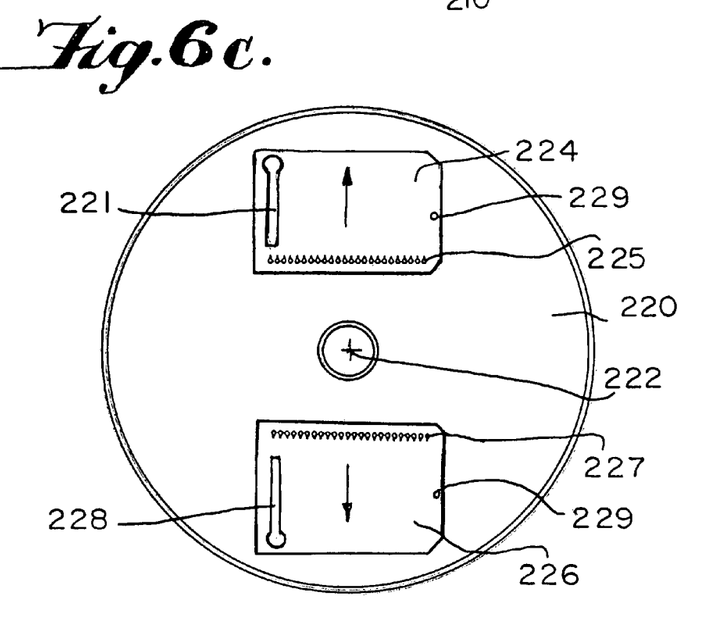
FIG. 6c is a top view of a platen holding two microfluidic devices each including a rectangular substrate.

FIG. 6c is a top view of a sample processing system that includes a rotatable platen 220 having a central axis of rotation 222, and microfluidic devices 224 and 226. Microfluidic device 224 can be oriented on platen 220 such that input ports 225 can be radially closer to axis of rotation 222 than the respective processing pathways 221. Similarly, microfluidic device 226 can be oriented on platen 220 such that input ports 227 can be radially closer to axis of rotation 222 than the respective processing pathways 228. Microfluidic devices 224, 226 can be held to platen 220 using a holder (not shown). Orientation for placement of microfluidic device 224, 226 can be assisted by one or more alignment pinholes 229, alignment pins (not shown), alignment notches, alignment recesses, or the like, in or included with the holder.

According to various embodiments, a sample processing system having a microfluidic device formed in a substrate and a holder to secure the microfluidic device can include at least one alignment pinhole formed in the substrate and at least one alignment pin in the holder. The at least one alignment pinhole can be complementary to the at least one alignment pin. The alignment pinhole can extend from a first surface of the substrate to an opposing second surface, thus forming a hole through the substrate. The alignment pinhole can partially extend through the first surface, without extending through the substrate to the second surface. Alignment can be by a notch on an edge of the substrate, for example, a semi-circular notch, a triangular notch, or a square notch. In various embodiments, at least one alignment pin complementary to the at least one alignment pinhole or notch, can be disposed in a holder to hold the microfluidic device to a rotatable platen.

According to various embodiments, a sample processing system is provided having a microfluidic device and a processing apparatus. The microfluidic device includes a substrate having a first surface, an opposite second surface, and a thickness, an input port formed in at least one of the first and second surfaces, and a manifold. The manifold can be formed in the substrate and in fluid communication with the input port. The manifold can include a feed channel that extends in a first direction, and a plurality of branch channels branching off the feed channel. The branch channels can be parallel to one another and can be normal to the feed channel. The processing apparatus can include a rotatable platen having an axis of rotation, a holder capable of holding a microfluidic device on or in the platen and being disposed off-center with respect to the axis of rotation, and a drive unit to rotate the platen about the axis of rotation. The microfluidic device can be held by the holder such that any radius of the platen which is parallel to the length or the width of the microfluidic device does not intercept the other of the width or the length, respectively, of the microfluidic device. The microfluidic device can include a plurality of input ports formed in the substrate, and a respective plurality of manifolds in fluid communication with the plurality of input ports.

According to various embodiments, a method of distributing a liquid sample into a plurality of branch channels in a microfluidic device is provided that includes providing a microfluidic device, introducing a liquid sample through an input port and into a feed channel of the microfluidic device, and centrifugally spinning the microfluidic device to force fluid from the feed channel into one or more of a plurality of branch channels of the microfluidic device. The microfluidic device can be part of a sample processing system that includes a rotatable platen with the microfluidic device held therein or thereon.

The holder for holding a microfluidic device in or on a platen, as described herein, can be formed using various methods and/or apparatuses. The holder can include a recess in the platen in which a microfluidic device can be placed and recessed. The holder can include pin and hole combinations, pin and notch combinations, clips, swing arms, screws, VELCRO, snaps, straps, tape, adhesive, a door, other fasteners, or a combination thereof to hold the microfluidic device in or on the platen.

Figure 7A:
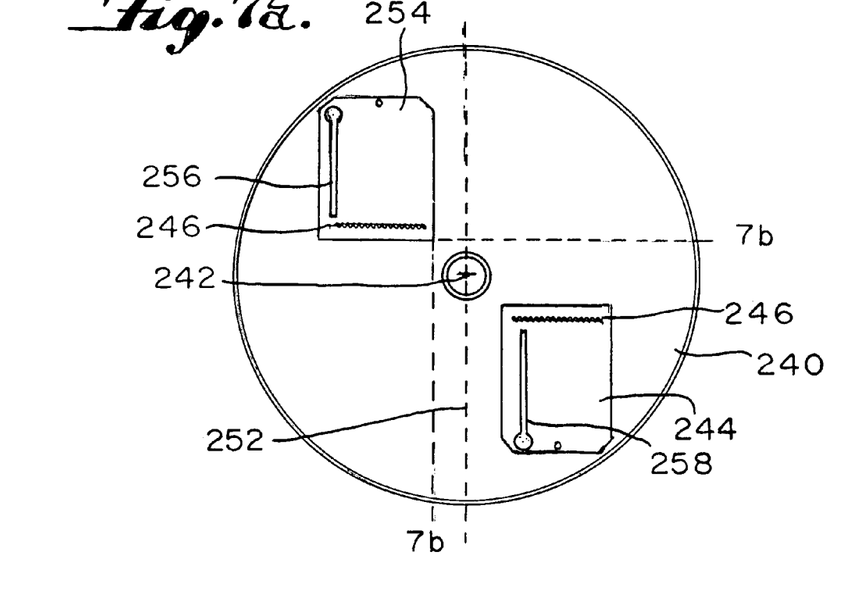
FIG. 7a is a top view of a microfluidic device having teardrop-shaped input ports oriented such that, when the microfluidic device is held on and spun by a rotatable platen, the narrow end of the teardrop-shaped input ports is radially further away from an axis of rotation than the circular end of the teardrop-shaped input port.
Figure 7B:
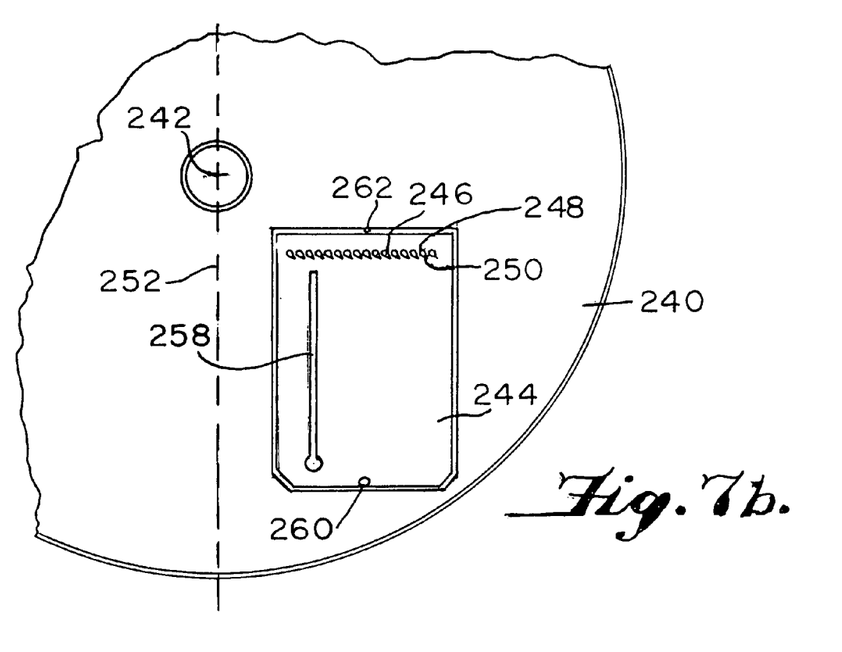

FIG. 7a is a top view of a rotatable platen 240 having a central axis of rotation 242 wherein two microfluidic devices 244, 254 can be disposed therein. Each microfluidic device can have an input port 246 that can be, for example, teardrop-shaped. The enlarged FIG. 7b, taken along line 7b of FIG. 7a, depicts a narrower-end 250 of a teardrop-shaped chamber 246 radially further from the central axis of rotation 242 of platen 240, than a circular first end 248 of teardrop-shaped chamber 246. Microfluidic device 244 is disposed in platen 240 such that centerline 252 of platen 240 is parallel to a length or a width of microfluidic devices 244, 254. According to various embodiments, alignment pinhole 260 and alignment notch 262 can be provided in each microfluidic device 244, 254. As shown in FIG. 7a, microfluidic device 254 can be to the left of the centerline 252 of platen 240. Microfluidic device 254 can be left-justified in its orientation. Microfluidic device 244 can be to the right of centerline 252. Microfluidic device 244 can be right-justified in its orientation. The location of microfluidic devices 244 and 254 with respect to the centerline 252 of platen 240 can determine a direction in which teardrop-shaped chamber 246 is canted. For example, for microfluidic device 244 located to the right of the centerline, narrower-end 250 of teardrop-shaped chamber 246 can point towards the right, as shown in FIG. 7b. According to various embodiments, the angle of the cant of the teardrop-shaped chambers 246 can be the same for all teardrop-shaped chambers 246 formed in a substrate. In another embodiment, narrower-end 250 of teardrop-shaped chambers 246 can be radially oriented. Each teardrop-shaped chamber 246 can have a unique cant angle.

According to various embodiments, teardrop-shaped chambers 240 can be located along a short side of the substrate. The teardrop-shaped chambers 240 can also be orientated on a long side of the substrate. According to various embodiments, the teardrop-shaped chambers 240 can be located at any position within the substrate such that the narrower end of the teardrop-shaped chamber is pointed away from the center of a platen to direct fluid toward the narrower portion of the teardrop-shaped chamber 240 and into an adjacent channel, chamber, or well.

Figure 8:
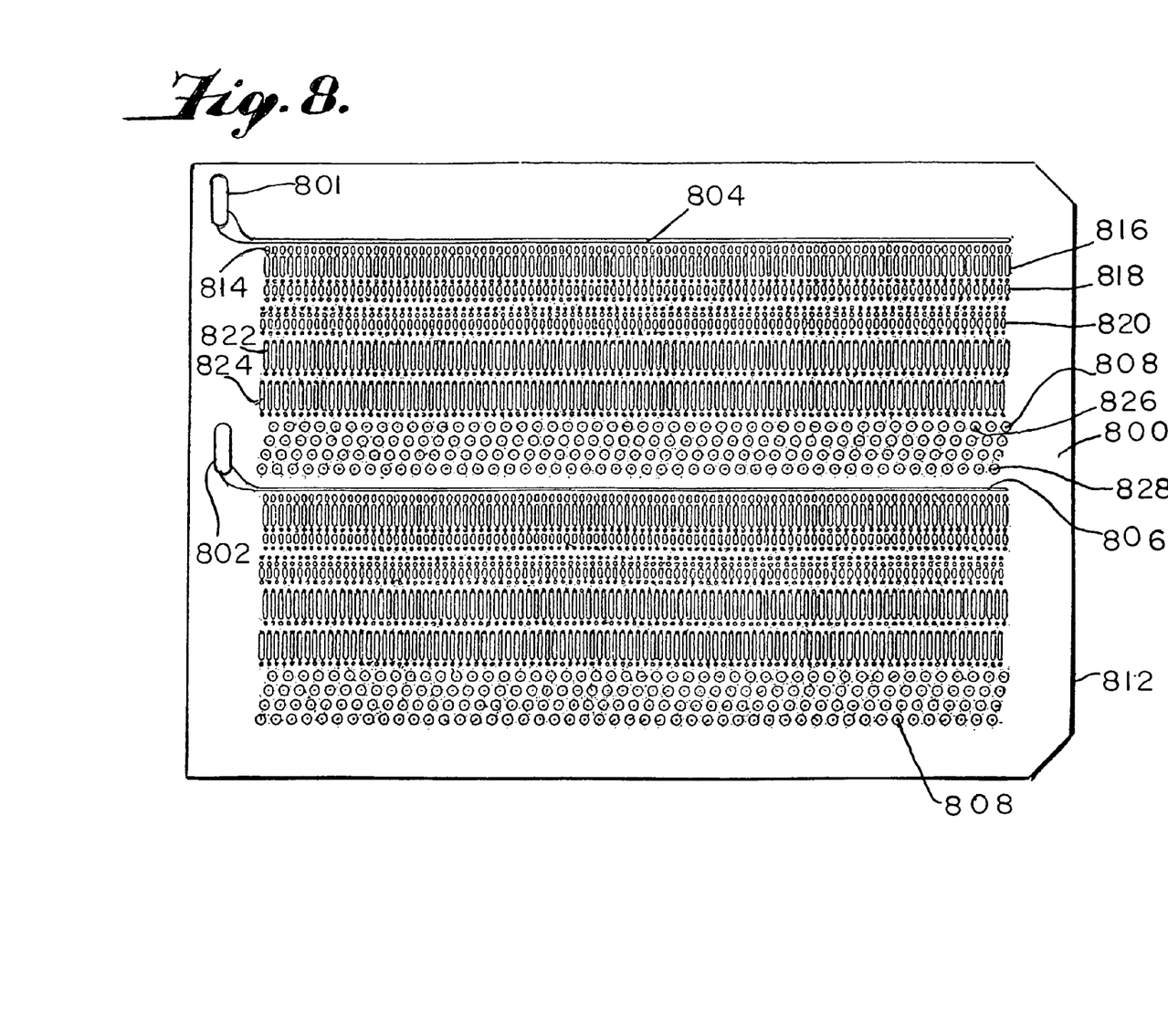
FIG. 8 is a diagram of a microfluidic device having a plurality of input ports capable of distributing a fluid sample to a respective plurality of flow distributors, each flow distribution respectively in fluid communication with a plurality of pathways.

FIG. 8 is a top view of an exemplary microfluidic device 800 having two input ports 801, 802 for distributing a fluid sample to respective flow distributors 804, 806, each flow distributor being in fluid communication with, or being designed to be valved in communication with a plurality of pathways. The various wells, chambers, channels, vias (not shown), valves, and other features can be manufactured using stereo-lithography, for example. The substrate can be cyclic olefin copolymer, or polycarbonate, for example. FIG. 8 shows an exemplary microfluidic device that includes 384 output ports 808. An exemplary microfluidic device can have a feed channel in fluid communication with 96 parallel branch channels that form 96 pathways. The pathways can each have a PCR chamber 814, a PCR purification chamber 816, a flow restrictor, a vertical flow-splitter that leads to both, a forward sequencing chamber 818 and a reverse sequencing chamber 820, a forward sequencing product purification chamber 822, a reverse sequencing product purification chamber 824, a purified forward sequencing product 826 output chamber, a purified reverse sequencing product output chamber 828, a plurality of opening and closing valves, or a combination thereof. Channels, wells, and chambers can be formed in a first and/or a second surface of the microfluidic device substrate 812. Vias and columns can be used to facilitate fluid communication between features formed respectively in the two surfaces of the device.

Exemplary spacing for various features in a microfluidic device can be as described herein, although other suitable spacing as known to those of ordinary skill in the art, can also be used. An exemplary microfluidic device can have a width of from about 80 to about 90 mm. The microfluidic device can have a length of from about 115 mm to about 130 mm. Two or more output wells in the microfluidic device can be disposed in the substrate such that a center of a first output well is about 2.25 mm from a center of a second output well along a first axis. Two or more output wells in the microfluidic device can be disposed in the substrate such that a center of the first output well is about 0.6 mm, for example, about 0.5625 mm, from a center of the second output well along a second axis. The substrate for the microfluidic device can have a thickness of about 2 mm. One or more output wells and/or processing chambers in the microfluidic device can have a depth of about 1.5 mm. One or more output wells in the microfluidic device can have a diameter of about 1.5 mm. One or more processing chambers in the microfluidic device can have a depth of about 0.9 mm. One or more processing chamber in the microfluidic device can have a width of about 0.6 mm. One or more processing chamber in the microfluidic device can have a length of about 0.5 mm, about 1.0 mm, about 2.5 mm, or about 3.5 mm. Channels connecting two or more processing chambers and/or an output wells can be rectangular-shaped. The channels can have depths of about 0.25 mm. The channels can have widths of about 0.25 mm. The channels can have lengths of from about 4 mm to about 25 mm. The channels can be disposed in the substrate about 0.6 mm, for example, about 0.5625 mm, from a center of a second channel. The channels can be straight. The channels can have one or more turns of any suitable angle or curvature, for example, of about 150 degrees.

Further microfluidic devices, substrates, covers, microfluidic manufacturing methods, input ports, output chambers, pathways, valves, reagents, flow restrictors, and methods of use are described in U.S. patent application Ser. No. 10/336,706 to DESMOND et al., filed Jan. 3, 2003, entitled "Microfluidic Size-Exclusion Devices, Systems, and Methods", and in U.S. patent application Ser. No. 10/336,274 to BRYNING et al., filed Jan. 3, 2003, entitled "Microfluidic Devices, Methods, and Systems", which are both incorporated herein in their entireties by reference.

Various advantages and features of a microfluidic device, system, and method have been described herein. Microfluidic devices and systems as described herein facilitate the flow of fluids through the microfluidic device when subjected to a centripetal force. Flow splitters and flow distributors capable of dividing fluid samples or reagents into aliquots are described. The features and methods described herein can be used with any microfluidic device that utilizes centrifugation for fluid transport.

Those skilled in the art can appreciate from the foregoing description that the broad teachings of the present application can be implemented in a variety of forms. Therefore, while this application has been described in connection with particular embodiments and examples thereof, the true scope of the application should not be so limited. Various changes and modifications may be made without departing from the scope of the application, as defined by the appended claims.

What is claimed is:

1. A sample processing system comprising:
   a microfluidic device wherein the device has a length and a width, the microfluidic device comprising a substrate having a first surface, an opposite second surface, and a thickness, an input port formed in at least one of the first surface or a second surface, a manifold formed in the substrate and in fluid communication with the input port, the manifold including a feed channel that extends in a first direction, and a plurality of branch channels each branching off the feed channel and each terminating at a closed end, and a plurality of closed chambers formed in the substrate, at least one of the closed chambers adjacent a respective closed end of the plurality of branch channels; and
   a processing apparatus, the processing apparatus comprising
   a rotatable platen having an axis of rotation,
   a holder capable of holding the microfluidic device on or in the platen, and being disposed off-center with respect to the axis of rotation, and
   a drive unit for rotating the platen about the axis of rotation,
   wherein the microfluidic device is held by the holder such that a radius of the platen which is parallel to the length or the width of the microfluidic device does not intercept the other of the width or the length, respectively, of the microfluidic device.

2. A sample processing system comprising a microfluidic device and a processing apparatus, the microfluidic device comprising:
- a substrate having a first surface, an opposite second surface, and a thickness,
- an input port formed in at least one of the first and second surfaces, and
- a manifold formed in the substrate and in fluid communication with the input port, the manifold including a feed channel that extends in a first direction, and
- a plurality of branch channels branching off the feed channel; and the processing apparatus comprising:
- a rotatable platen having an axis of rotation,
- a holder capable of holding a microfluidic device on or in the platen and capable of holding the microfluidic device off-center with respect to the axis of rotation; and
- a drive unit to rotate the platen about the axis of rotation.

3. The sample processing system of claim 2, wherein the microfluidic device comprises a plurality of input ports formed in the substrate, and a respective plurality of manifolds in fluid communication with the plurality of input ports.

4. The sample processing system of claim 2, wherein the microfluidic device is held by the holder on the platen, and the input port is radially closer than the plurality of branch channels to the axis of rotation.

5. The sample processing system of claim 2, further including a drive control unit for controlling the drive unit.

6. The sample processing system of claim 2, wherein the plurality of branch channels are parallel to one another.

* * * * *